(12) United States Patent
Shveidel et al.

(10) Patent No.: US 11,494,303 B1
(45) Date of Patent: Nov. 8, 2022

(54) DATA STORAGE SYSTEM WITH ADAPTIVE, MEMORY-EFFICIENT CACHE FLUSHING STRUCTURE

(71) Applicant: EMC IP Holding Company LLC, Hopkinton, MA (US)

(72) Inventors: Vladimir Shveidel, Pardes-Hana (IL); Geng Han, Beijing (CN); Yousheng Liu, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/488,644

(22) Filed: Sep. 29, 2021

(51) Int. Cl.
  *G06F 12/08* (2016.01)
  *G06F 12/0802* (2016.01)
(52) U.S. Cl.
  CPC ...... *G06F 12/0802* (2013.01); *G06F 2212/60* (2013.01)
(58) Field of Classification Search
  CPC .................................................. G06F 12/0802
  USPC ........................................................ 711/135
  See application file for complete search history.

(56) References Cited

U.S. PATENT DOCUMENTS

| 7,568,068 | B2 | 7/2009 | Kulkarni et al. |
| 8,719,501 | B2 | 5/2014 | Flynn et al. |
| 9,092,337 | B2 | 7/2015 | Nellans et al. |
| 2004/0123040 | A1* | 6/2004 | Jung ............. G06F 12/0831 711/146 |
| 2006/0075194 | A1 | 4/2006 | Mosur et al. |
| 2011/0022819 | A1* | 1/2011 | Post ............. G06F 12/1009 711/E12.001 |

* cited by examiner

*Primary Examiner* — Jae U Yu
(74) *Attorney, Agent, or Firm* — BainwoodHuang

(57) ABSTRACT

In a method of flushing cached data in a data storage system, instances of a working-set structure (WSS) are used over a succession of operating periods to organize cached data for storing to the persistent storage. In each operating period, leaf structures of the WSS are associated with respective address ranges of a specified size. Between operating periods, a structure-tuning operation is performed to adjust the specified size and thereby dynamically adjust a PD-to-leaf ratio of the WSS, including (1) comparing a last-period PD-to-leaf ratio to a predetermined ratio range, (2) when the ratio is below the predetermined ratio range, increasing the specified size for use in a next operating period, and (3) when ratio is above the predetermined ratio range, then decreasing the specified size for use in the next operating period.

20 Claims, 12 Drawing Sheets

DATA STORAGE SYSTEM WITH ADAPTIVE, MEMORY-EFFICIENT CACHE FLUSHING STRUCTURE

BACKGROUND

Data storage systems are arrangements of hardware and software in which storage processors are coupled to arrays of non-volatile storage devices, such as magnetic disk drives, electronic flash drives, and/or optical drives. The storage processors service storage requests arriving from host machines ("hosts"), which specify blocks, files, and/or other data elements to be written, read, created, deleted, etc. Software running on the storage processors manages incoming storage requests and performs various data processing tasks to organize and secure the data elements on the non-volatile storage devices.

Some storage systems include a high-speed non-volatile cache into which all writes are persisted upon receipt in order to ensure that the writes are secured against power failure even when the system operates in a write-back mode. Write-back mode allows writes to be acknowledged prior to being completed. These systems acknowledge writes once they are stored in the high-speed non-volatile cache.

SUMMARY

A method is disclosed of flushing cached data to persistent storage in a data storage system. Over a succession of operating periods, respective instances of a working-set structure are used to organize cached data for storing to the persistent storage. The instances of the working-set structure include respective leaf structures referring to corresponding page descriptors (PDs) for respective data pages to be persisted. In each operating period, the leaf structures are associated with respective distinct address ranges of a specified size which remains constant over each operating period but generally varies between operating periods.

Between the operating periods, a structure-tuning operation is performed to adjust the specified size of the address ranges and thereby dynamically adjust a PD-to-leaf ratio of the working-set structure. The structure-tuning operation includes (1) comparing a last-period PD-to-leaf ratio of a last preceding operating period to a predetermined ratio range, (2) when the last-period PD-to-leaf ratio is below the predetermined ratio range, then increasing the specified size for use in a next-succeeding operating period, and (3) when the last-period PD-to-leaf ratio is above the predetermined ratio range, then decreasing the specified size for use in the next-succeeding operating period.

By the above method, the structure and operation of the working-set structure is adapted to the workload, improving memory efficiency and operation by reducing contention for certain related data structures, as described more below.

The foregoing summary is presented for illustrative purposes to assist the reader in readily grasping example features presented herein. However, the foregoing summary is not intended to set forth required elements or to limit embodiments hereof in any way.

BRIEF DESCRIPTION OF THE DRAWINGS

The foregoing and other features and advantages will be apparent from the following description of particular embodiments of the invention, as illustrated in the accompanying drawings, in which like reference characters refer to the same or similar parts throughout the different views.

DETAILED DESCRIPTION

Modern data storage systems use write caching to optimize write operation latency. A data storage system write cache may also be referred to as a data journal or write log. In operation, data of host write commands is stored into the write cache in the first instance, then destaged or "flushed" out to persistent secondary storage in a separate operation. This arrangement provides considerable performance advantages as generally known.

To make cache flushing flow smoother and eliminate necessity of bulk operations of sorting cache content (flush working set) in each flush cycle, a so-called "pull model" can be utilized. According to this model the cache content is maintained presorted, i.e. data units of the cache are placed into a shared working-set structure in an organized manner at the time of ingest. Then a set of uniform flushers operate to in parallel to "pull" data for destaging, by independently detaching the data units and writing the data out to persistent storage.

In one approach, the shared working-set structure has a hierarchical arrangement whose bottom-level structures, called "leaf structures", point to page descriptors that describe units of cached data, which is stored in associated page buffers. This arrangement can be highly effective in supporting robust operations according to the pull model.

However, it may also exhibit certain drawbacks that could present capacity and/or performance issues. In particular, for certain operating scenarios, the leaf structures may be very inefficiently used, so that an unacceptably large amount of memory is required for the shared working-set structure. In other scenarios, there may be undue contention for access to higher-level structures of the cache, reducing performance accordingly.

The specification below provides description of both an example structure and functioning of a data storage system cache employing the pull model as described above, followed by a description of a technique for dynamically adapting the use of the structure according to workload, thereby improving both the memory efficiency of the working-set structure and performance of cache data flushing operations.

Figure 1:
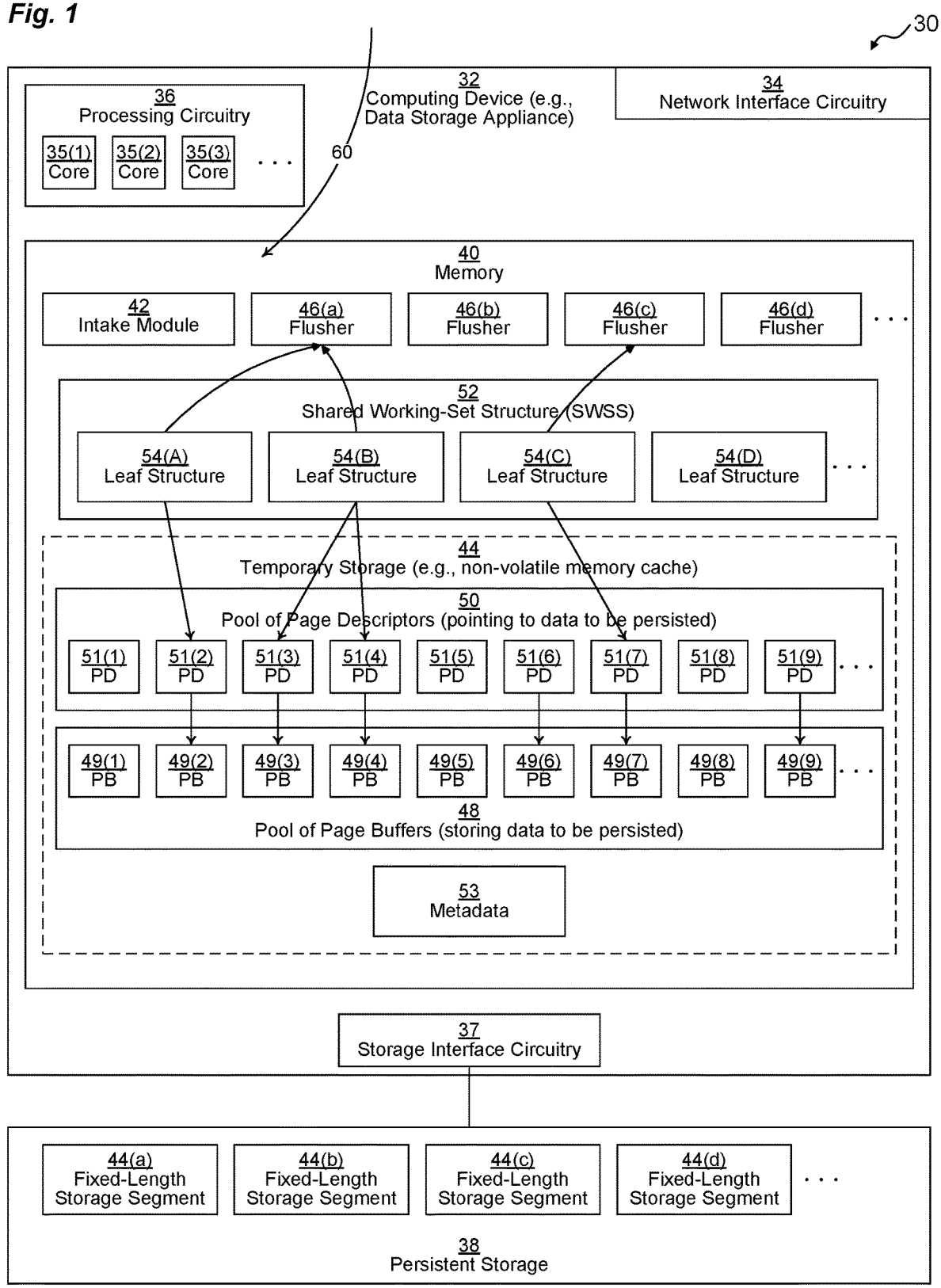
FIG. 1 is a block diagram depicting an example system, apparatus, and data structure arrangement for use in connection with various embodiments.

FIG. 1 depicts an example environment 30 for use in connection with various embodiments. Environment 30 includes a computing device 32. Computing device 32 may be any kind of computing device, such as, for example, a personal computer, workstation, server computer, enterprise server, data storage array device, laptop computer, tablet computer, smart phone, mobile computer, etc. In an example embodiment, computing device 32 may be a data storage appliance configured to provide access to persistent storage 38.

Computing device 32 may include network interface circuitry 34, processing circuitry 36, storage interface circuitry 37, and memory 40.

Processing circuitry 36 may include any kind of processor or set of processors configured to perform operations, such as, for example, a microprocessor, a multi-core microprocessor, a digital signal processor, a system on a chip (SoC), a collection of electronic circuits, a similar kind of controller, or any combination of the above. As depicted, processing circuitry 36 includes a plurality of cores 35 (depicted as cores 35(1), 35(2), 35(3), . . . ).

Storage interface circuitry 37 controls and provides access to persistent storage 38. Storage interface circuitry 37 may include, for example, SCSI, SAS, ATA, SATA, FC, M.2, U.2, and/or other similar controllers and ports. Persistent storage 38 includes a plurality of non-transitory persistent storage drives (not depicted), such as, for example, hard disk drives, solid-state storage devices (SSDs), flash drives, etc.

Network interface circuitry 34 may include one or more Ethernet cards, cellular modems, Fibre Channel (FC) adapters, InfiniBand adapters, wireless networking adapters (e.g., Wi-Fi), and/or other devices for connecting to a network (not depicted), such as, for example, a LAN, WAN, SAN, the Internet, a wireless communication network, a virtual network, a fabric of interconnected switches, etc.

Memory 40 may include any kind of digital system memory, such as, for example, random access memory (RAM). Memory 40 stores an operating system (OS) (not depicted) and various drivers (e.g., storage drivers, not depicted) in operation (e.g., a Linux, UNIX, Windows, MacOS, or similar operating system). Memory 40 also stores an intake module 42, a plurality of flushers 46 (depicted as flushers 46(a), 46(b), 46(c), 46(d), . . . ), and other software modules (not depicted) which each execute on processing circuitry 36. Memory 40 also stores a shared working-set structure (SWSS) 52.

In some embodiments, memory 40 includes a temporary storage portion 44 of non-volatile memory, such as, for example, a high-speed cache. Non-volatile memory portion 44 may include, for example, Intel Optane memory, a high-speed SSD drive, etc. In some embodiments, non-volatile memory portion 44 may be shared or mirrored with another computing device 32.

Memory 40, typically within non-volatile memory portion 44, includes a pool 48 of page buffers 49 (depicted as PBs 49(1), 49(2), 49(3), 49(4), 49(5), 49(6), 49(7), 49(8), 49(9), . . . ), a pool 50 of page descriptors 51(depicted as PDs 51(1), 51(2), 51(3), 51(4), 51(5), 51(6), 51(7), 51(8), 51(9), . . . ), and metadata 53.

PDs 51 reference and describe respective PBs 49. In some embodiments, a PD 51 points to a respective PB 49, while in other embodiments, the PDs 51 are laid out within pool 50 in such a way that the location of each PD 51 within pool 50 implicitly associates it with a respective PB 49, the PBs 49 also being laid out within pool 48 in a similar manner.

Each PB 49 may be, for example, a memory page (e.g., 4 or 8 kilobytes), representing cached data to be written to long-term persistent storage 38 as parts of transactions. The PD 51 that is associated with a PB 49 describes the transaction, including, for example, information about a logical location where the data is meant to be placed (e.g., a volume and logical block address) and a transaction sequence number. Some PDs 51 may not refer to specific data in a PB 49 (e.g., if the PD 51 describes a delete or unmap operation or a zero-fill or write-same operation); in some such embodiments these bufferless PDs 51 may be stored separately from the buffered PDs 51 that are associated with respective PBs 49. An incoming write operation 60 that is directed to a range of addresses may be initially ingested as a set of PBs 49, one for each block covered by the range of addresses to be written, each of these PBs 49 having a respective PD 51 that identifies the particular logical address within the range of addresses for that block.

SWSS 52 is a structure that organizes the PDs 51. SWSS 52 includes various leaf structures 54, each of which references one or more related PDs 51. For more information about the makeup of a leaf structure 54, see below in connection with FIG. 4. SWSS 52 may also include various additional structure, not depicted in FIG. 1, which organizes the leaf structures 54. For more information about the organization of leaf structures within SWSS 52, see below in connection with FIGS. 3A-3C.

In operation, intake module 42 initially processes incoming write commands 60 (and other commands that make changes, such as delete and unmap commands), creating PBs 49 and respective PDs 51 and organizing those PDs 51 into leaf structures 54 within SWSS 52, as well as organizing the leaf structures 54 within the SWSS 52. In addition, several flushers 46 operate concurrently. Each flusher 46 is responsible for a particular fixed-length storage segment (FLSS) 44 (depicted as fixed-length storage segments 44(a), 44(b), 44(c), 44(d), . . . ) in persistent storage 38. Each flusher 46 operates independently, accessing particular PDs 51 by claiming leaf structures 54 from the SWSS 52 and persisting the data of the PBs 49 of those PDs 51 in its respective FLSS 52. Thus, for example, as depicted, PD 51(2) is referenced by leaf structure 54(A), PDs 52(3), 51(4) are referenced by leaf structure 54(B), and PD 51(7) is referenced by leaf structure 54(C). In addition, flusher 46(a) has claimed leaf structures 54(A), 54(B), so it persists the data of PBs 49(2), 49(3), 49(4) to the FLSS 44(a) assigned to flusher 46(a). While doing so, flusher 46(a) also updates metadata 53 in order to persist information about where the data of PBs 49(2), 49(3), 49(4) is stored in persistent storage 38. An FLSS 44 has a fixed size which may vary from embodiment to embodiment. In one example embodiment, an FLSS 44 has a size of 2 megabytes (MB). The size of an FLSS 44 may be selected based on a layout of the persistent storage 38. Thus, for example, if persistent storage 38 utilizes RAID-5 with a 4+1 configuration, then 1 MB or 2 MB may be convenient sizes (e.g., writing 256 KB or 512 KB per drive per stripe). As another example, if persistent storage 38 utilizes RAID-6 with a 6+2 configuration, then 1.5 MB or 3 MB may be convenient sizes (e.g., writing 256 KB or 512 KB per drive per stripe).

Memory 40 may also store various other data structures used by the OS, modules 42, 46, and various other applications and drivers. In some embodiments, memory 40 may also include a persistent storage portion. Persistent storage portion of memory 40 may be made up of one or more persistent storage devices, such as, for example, magnetic disks, flash drives, solid-state storage drives, or other types of storage drives. Persistent storage portion of memory 40 or persistent storage 38 is configured to store programs and data even while the computing device 32 is powered off. The OS, modules 42, 46, and various other applications and drivers are typically stored in this persistent storage portion of memory 40 or on persistent storage 38 so that they may be loaded into a system portion of memory 40 upon a system restart or as needed. The OS, modules 42, 46, and various other applications and drivers, when stored in non-transitory form either in the volatile portion of memory 40, or on persistent storage 38 or in persistent portion of memory 40, each form a computer program product. The processing circuitry 36 running one or more applications thus forms a specialized circuit constructed and arranged to carry out the various processes described herein.

Figure 2:
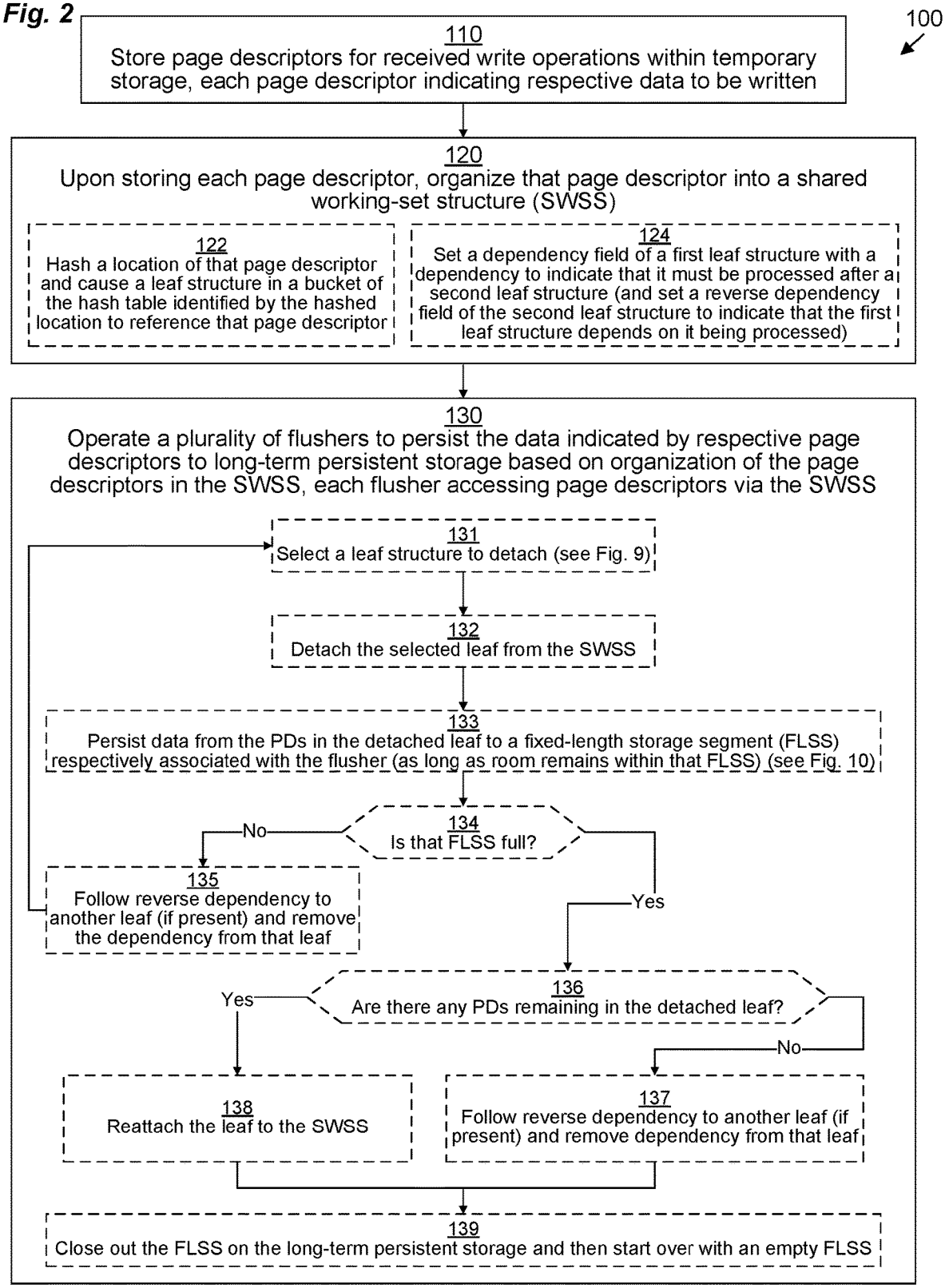
FIG. 2 is a flowchart depicting an example procedure according to various embodiments.

FIG. 2 illustrates an example method 100 performed by computing device 32. It should be understood that any time a piece of software (e.g., OS, modules 42, 46, etc.) is described as performing a method, process, step, or function, what is meant is that a computing device (e.g., computing device 32) on which that piece of software is running performs the method, process, step, or function when executing that piece of software on its processing circuitry 36. It should be understood that one or more of the steps or sub-steps of method 100 may be omitted in some embodiments. Similarly, in some embodiments, one or more steps or sub-steps may be combined together or performed in a different order. Dashed lines indicate that a step or sub-step is either optional or representative of alternate embodiments or use cases.

In step 110, intake module 42 stores PDs 51 for received write operations 60 within temporary storage 44, each PD 51 indicating respective data (e.g., a PB 49) to be written (e.g., to a particular logical address managed by the computing device 32 operating as a data storage appliance).

In step 110, upon storing each PD 51, intake module 42 organizes that PD 51 into SWSS 52. For example, intake module 42 causes that PD 51 to be referenced by a particular leaf structure 54, possibly also modifying the organization of the leaf structures 54 within SWSS 52. In some embodiments, step 120 may also include one or more of sub-steps 122, 124.

Figure 3A:
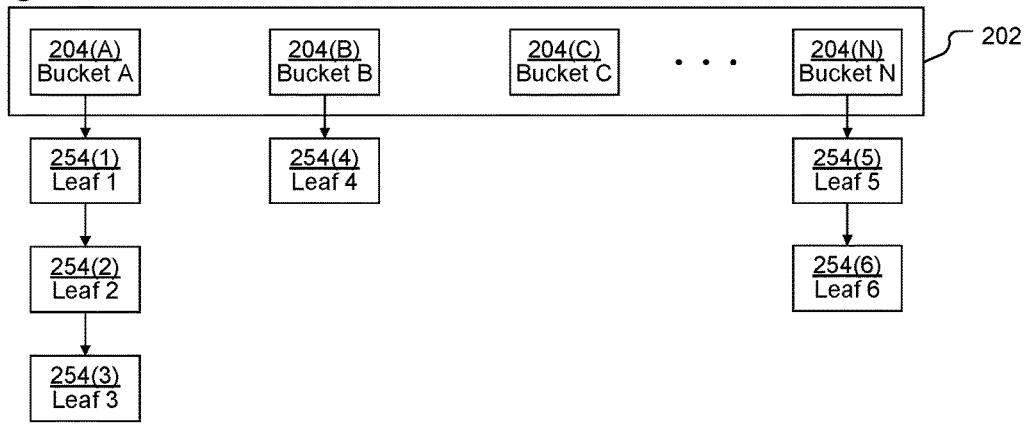
FIGS. 3A-3C are block diagrams depicting various example data structure arrangements for use in connection with various embodiments.

Sub-step 122 may best be illustrated with reference to FIG. 3A. FIG. 3A illustrates an example arrangement 200 of SWSS 52, including a leaf hash table 202. Leaf hash table 202 includes a set of buckets 204 (depicted as buckets 202(A), 202(B), 202(C), ... 202(N)). One or more buckets 204 points to a chain of leaf structures 254, which are specific examples of the leaf structures 54 of FIG. 1. As depicted in FIG. 3A, bucket 204(A) points to leaf structures 254(1), 254(2), 254(3), bucket 204(B) points to leaf structure 254(4), and bucket 204(N) points to leaf structures 254(5), 254(6), while bucket 204(C) is empty. In sub-step 122, intake module 42 hashes a location of a PD 51 and causes a leaf structure 254 in a bucket 204 (of the leaf hash table 202) identified by the hashed location to reference that PD 51. Thus, for example, if a PD 51 is addressed to a particular address (e.g., address 743) that falls within a particular address range (e.g., an address range of 512-1023) that happens to be associated with leaf 3 254(3), then by hashing an identifier of that address range (e.g., 512, as the first block of the address range), bucket A 204(A) is identified. Leaf structures 254(1), 254(2), 254(3) all have different address ranges that all happen to hash to bucket A, but by navigating the chain, the proper leaf structure 254(3) can be identified.

Figure 4:
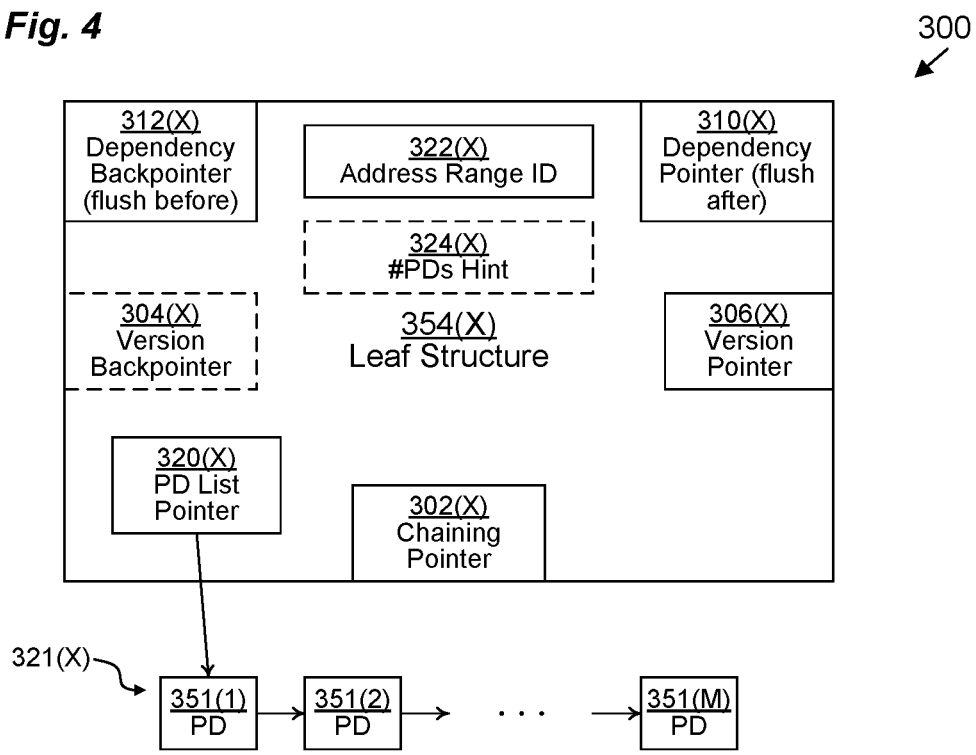
FIG. 4 is a block diagram depicting an example data structure arrangement for use in connection with various embodiments.

Sub-step 124 may best be illustrated with reference to FIG. 4. FIG. 4 illustrates an example arrangement 300 of a leaf structure 354(X), which again is a specific example of a leaf structure 54 of FIG. 1. Leaf structure 354(X) includes a chaining pointer 302(X) that points to a next element in a bucket chain. For example, with reference to FIG. 3A, leaf structure 254(1) has a chaining pointer 302 that points to leaf structure 254(2), and leaf structure 254(2) has a chaining pointer 302 that points to leaf structure 254(3), while leaf structure 254(3) has a NULL chaining pointer 302 to indicate the end of the chain.

Returning to FIG. 4, leaf structure 354(X) also includes a PD list pointer 320(X) that points to a first PD 351(1) in a linked list 321(X) of PDs 351 that are referenced by the leaf structure. As depicted, linked list 321(X) includes MPDs 351 (depicted as PDs 351(1), 351(2), ..., 351(M)). The PDs 351 in the linked list 321(X) are all directed to operations aimed at a particular address range identified by an address range identifier 322(X) also stored within the leaf structure 354(X). Typically the PDs 351 are added to the linked list 321(X) as they are received, so they are normally in sequence, although it is possible for the PDs 351 to be slightly out of order. In some embodiments, the number M of PDs 351 in the list 321(X) may also be stored as a Number of PDs hint 324(X) within the leaf structure 354(X).

Figure 3B:
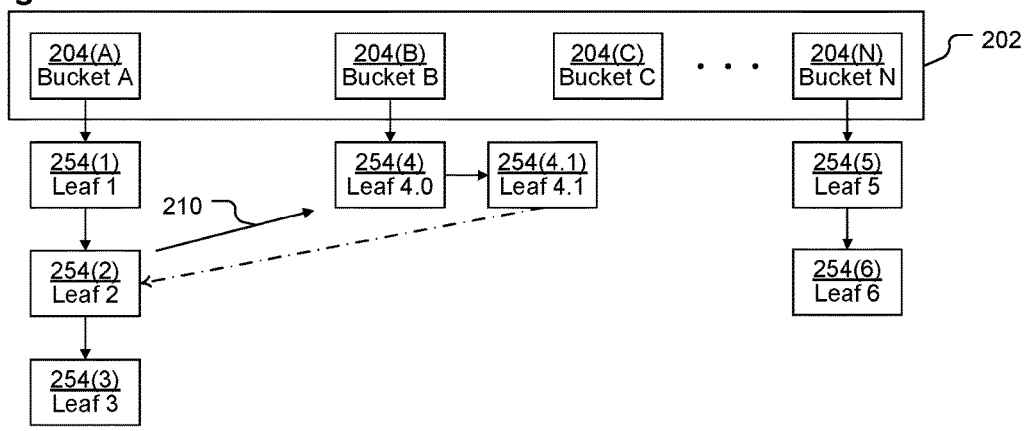

The remaining elements of FIG. 4 may best be illustrated with reference to FIG. 3B. FIG. 3B represents another arrangement 200' similar to arrangement 200 of FIG. 3A but just after a copy command 210 has been ingested indicating that one or more blocks within the address range of leaf structure 2 254(2) should be copied to an address or addresses within leaf structure 4 254(4). At this point, leaf structure 4 is split into original leaf structure 4.0 254(4) and new leaf structure 4.1 254(4.1). New leaf structure 4.1 254(4.1) is used for all new write commands beginning with the copy operation 210, while original leaf structure 4.0 254(4) continues to include PDs 51 for operations that preceded the copy operation. Since the state of new leaf structure 4.1 254(4.1) is dependent on the state of leaf structure 2 254(2), new leaf structure 4.1 254(4.1) is dependent on (indicated by the dash-dot arrow) leaf structure 2 254(2). Returning to FIG. 4, version pointer 306(X) is used to chain together a list of versions of the same leaf structure 54 with different dependency states, while dependency pointer 310(X) and dependency backpointer 312(X) are used to indicate dependency. Thus, in FIG. 3B, original leaf structure 4.0 254(4) has a version pointer 306 that points to new leaf structure 4.1 254(4.1), while new leaf structure 4.1 254(4.1) has a NULL version pointer 306. In some embodiments, new leaf structure 4.1 254(4.1) may also contain a version backpointer 304 that points back to original leaf structure 4.0 254(4). In addition, new leaf structure 4.1 254(4.1) has a dependency pointer 310 that points to leaf structure 2 254(2) to indicate that new leaf structure 4.1

254(4.1) should be flushed after leaf structure 2 254(2), and leaf structure 2 254(2) has a dependency backpointer 312 that points to new leaf structure 4.1 254(4.1) to indicate that leaf structure 2 254(2) should be flushed before new leaf structure 4.1 254(4.1).

Returning to FIG. 2, in sub-step 124, intake module 42 sets a dependency field 310 of a first leaf structure 54 (e.g., new leaf structure 4.1 254(4.1)) with a dependency (e.g., due to a copy operation 210) to indicate that it must be processed after a second leaf structure 54 (e.g., leaf structure 2 254(2)). Intake module 42 also sets a reverse dependency field 312 of the second leaf structure 54 (e.g., leaf structure 2 254(2)) to indicate that the first leaf structure 54 (e.g., new leaf structure 4.1 254(4.1)) depends on it being processed first.

Figure 3C:
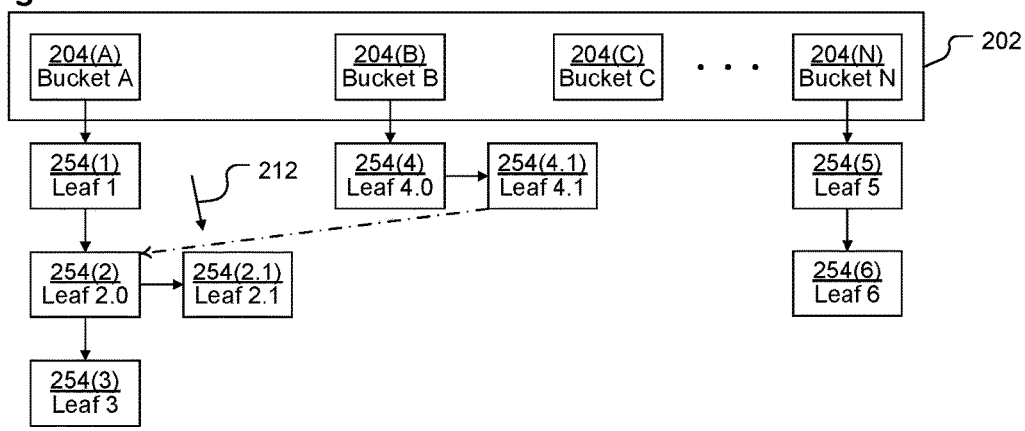

FIG. 3C represents another arrangement 200" similar to arrangement 200' of FIG. 3B but just after a write command 212 has been ingested aimed at one or more blocks within the address range of leaf structure 2 254(2). At this point, leaf structure 2 is split into original leaf structure 2.0 254(2) and new leaf structure 2.1 254(2.1). New leaf structure 2.1 254(2.1) is used for all new write commands 212 subsequent to the copy operation 210, while original leaf structure 2.0 254(2) continues to include PDs 51 for operations that preceded the copy operation 210. In some embodiments (not depicted), instead of waiting for the first write command 212 after the copy operation 210, the split of leaf structure 2 may happen right after the copy operation 210 is ingested.

Figure 5:
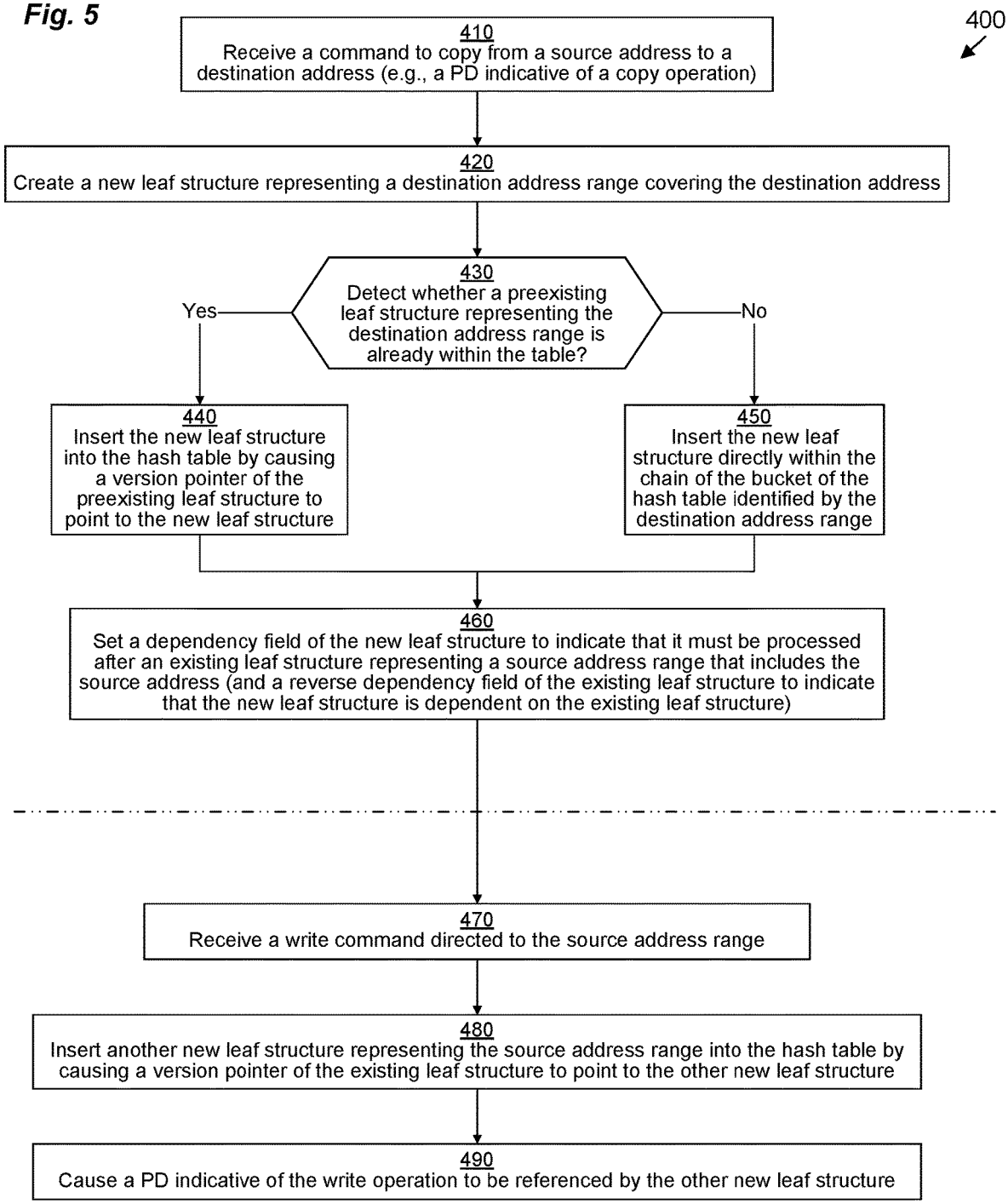
FIG. 5 is a flowchart depicting an example procedure according to various embodiments.

FIG. 5 illustrates an example method 400, performed by intake module 42, that describes what happened in FIG. 3B (steps 410-460) and 3C (steps 470-490). It should be noted that what is described in FIG. 3B is when decision step 430 yields an affirmative result, resulting in performance of step 440. In the event that decision step 430 yields a negative result (i.e., the address range of the destination of the copy command 210 is not yet represented by any leaf structure 254 in the leaf hash table 202), step 450 is performed instead, in which a new leaf structure 254 is added directly into the chain of the appropriate bucket 204.

Figure 6A:
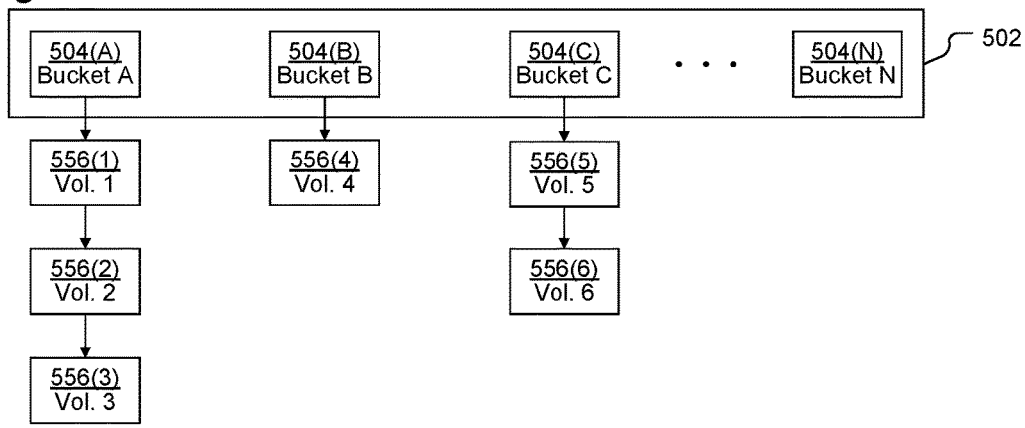
FIGS. 6A-6C are block diagrams depicting various example data structure arrangements for use in connection with various embodiments.

It should be noted that, in some embodiments, SWSS 52 may also include a volume hash table 502 as depicted in arrangement 500 of FIG. 6A. Volume hash table 502 includes a set of buckets 504 (depicted as buckets 502(A), 502(B), 502(C), . . . 502(N)). One or more buckets 504 points to a chain of volume structures 556. As depicted, bucket 504(A) points to volume structures 556(1), 556(2), 556(3), bucket 504(B) points to volume structure 556(4), and bucket 504(C) points to volume structures 556(5), 556(6), while bucket 504(N) is empty. Each volume structure 556 represents a volume or logical disk. In some embodiments, each volume structure 556 has its own dedicated leaf hash table 202, while in other embodiments, all the volume structures 556 share a global leaf hash table 202.

Figure 7:
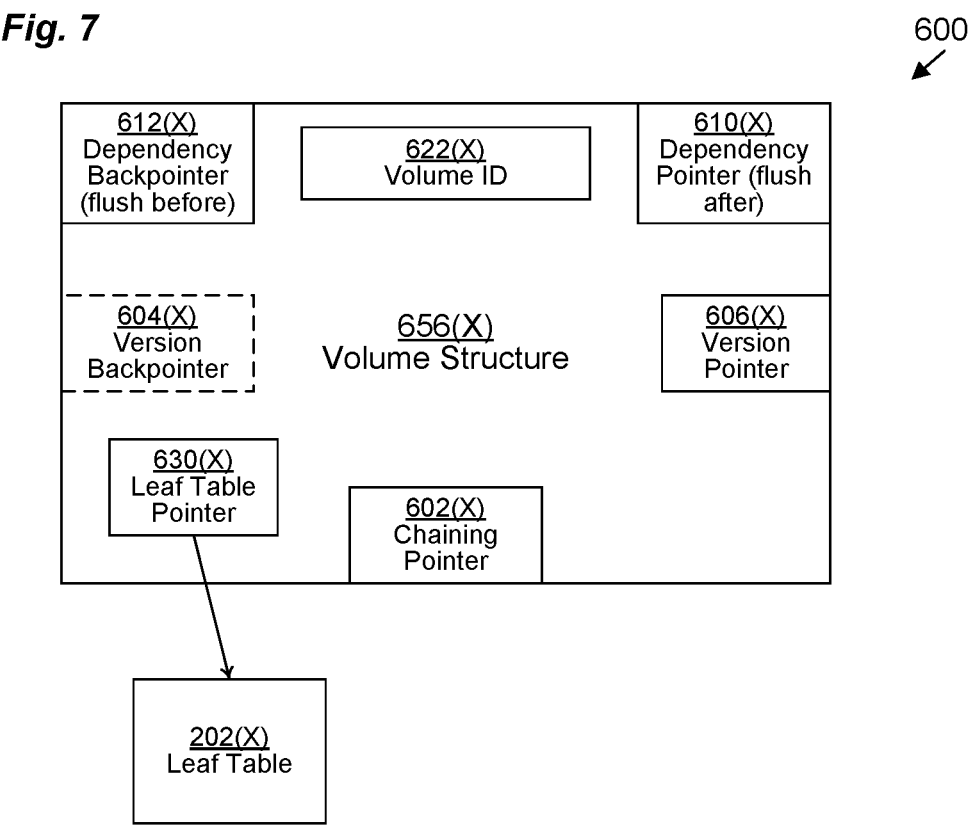
FIG. 7 is a block diagram depicting an example data structure arrangement for use in connection with various embodiments.

FIG. 7 illustrates an example arrangement 600 of a volume structure 656(X). Volume structure 656(X) includes a chaining pointer 602(X) that points to a next element in a bucket chain. For example, with reference to FIG. 6A, volume structure 556(1) has a chaining pointer 602 that points to volume structure 556(2), and volume structure 556(2) has a chaining pointer 602 that points to volume structure 556(3), while volume structure 556(3) has a NULL chaining pointer 602 to indicate the end of the chain.

Returning to FIG. 7, volume structure 656(X) also includes a volume identifier 622(X). Volume structure 656 (X) also includes a leaf table pointer 630(X) that points to leaf hash table 202(X) that represents the volume of volume structure 656(X). In some embodiments (not depicted), instead of pointing to a leaf hash table 202(X), pointer 630(X) points to a first leaf structure 254 in a linked list of leaf structures 254 within a global leaf hash table 202, the linked list including all leaf structures 254 that belong to the particular volume of volume structure 656(X).

Figure 6B:
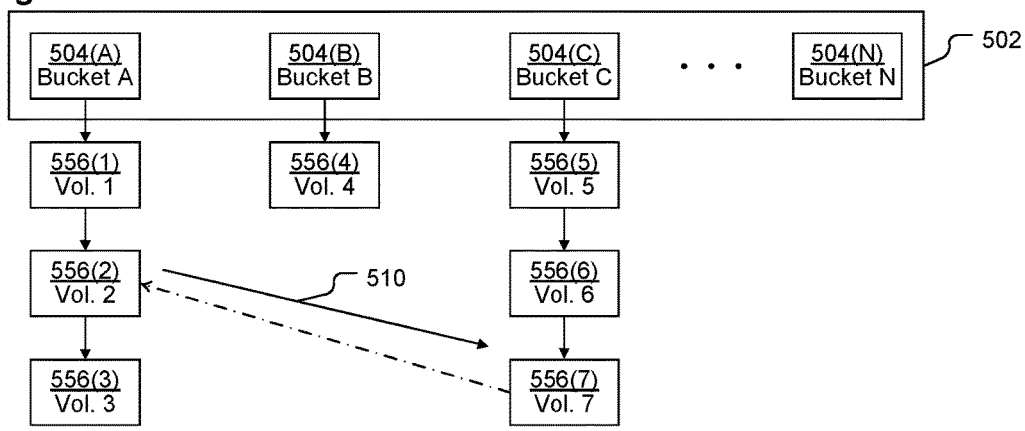
Figure 8:
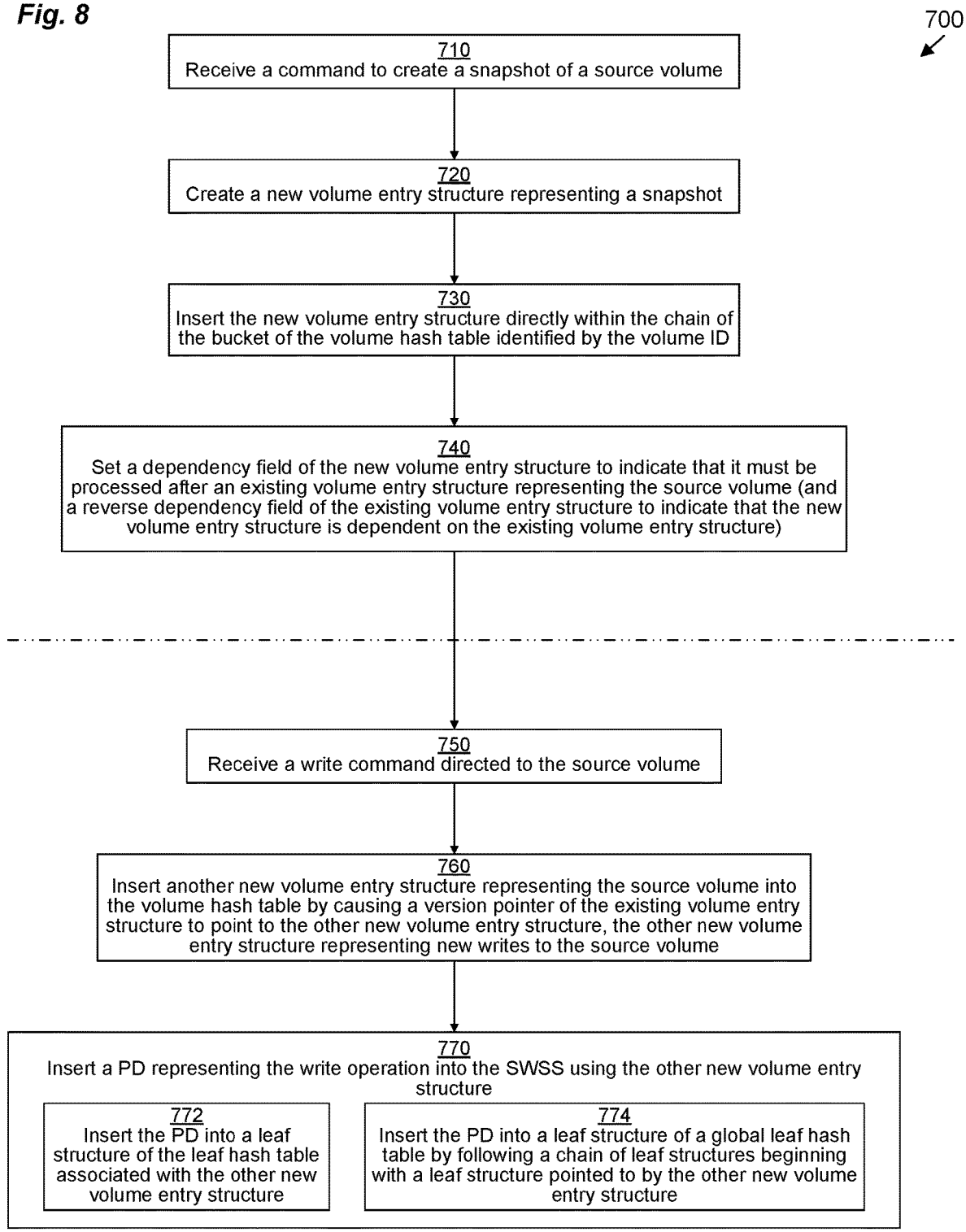
FIG. 8 is a flowchart depicting an example procedure according to various embodiments.

The remaining elements of FIG. 7 may best be illustrated with reference to FIGS. 6B, 6C, and 8. FIG. 6B represents another arrangement 500' similar to arrangement 500 of FIG. 6A but just after a snapshot command 510 has been ingested indicating that volume 2 (represented by volume structure 556(2)) should be snapshotted to create a point-in-time copy, volume 7 (step 710 of method 700 of FIG. 8). Thus, a new volume entry 556(7) is created to represent the new snapshot volume, volume 7 (step 720) and it is inserted into the volume hash table 502 (step 730). Since the state of the snapshot, volume 7, is dependent on the state of original volume 2, new volume structure 556(7) is set to be dependent on (indicated by the dash-dot arrow) volume structure 556(2). This may be done by intake module 42 (step 740) setting a dependency field 610 of new volume structure 556(7) with a dependency (e.g., due to a snapshot operation 510) to indicate that it must be processed after original volume structure 556(2). Intake module 42 also sets a reverse dependency field 612 of the original volume structure 556(2) to indicate that the new volume structure 556(7) depends on it being processed first.

Figure 6C:
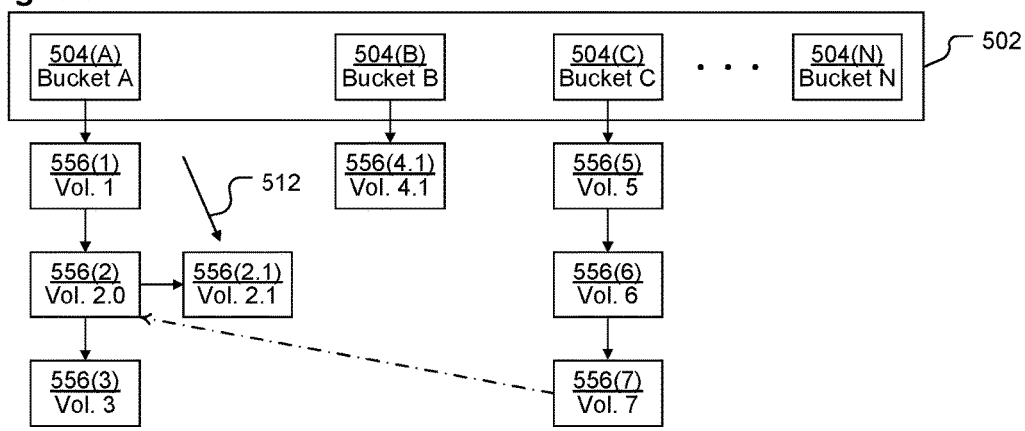

FIG. 6C represents another arrangement 500" similar to arrangement 500' of FIG. 6B but just after a write command 512 has been ingested aimed at one or more blocks within volume 2 (step 750). At this point, volume structure 556(2) is split into original volume structure 2.0 556(2) and new volume structure 2.1 556(2.1) (step 760). New volume structure 2.1 556(2.1) is used for all new write commands 512 subsequent to the snapshot operation 510 (step 770), while original volume structure 2.0 556(2) continues to include PDs 51 for operations that preceded the snapshot operation 510. In some embodiments (not depicted), instead of waiting for the first write command 512 after the snapshot operation 510, the split of volume structure 556(2) may happen right after the snapshot operation 510 is ingested.

Returning to FIG. 7, version pointer 606(X) is used to chain together a list of versions of the same volume structure 556 with different dependency states, while dependency pointer 610(X) and dependency backpointer 612(X) are used to indicate dependency. Thus, in FIG. 6C, original volume structure 556(2) has a version pointer 606 that points to new volume structure 556(2.1), while new volume structure 556(2.1) has a NULL version pointer 606. In some embodiments, new volume structure 556(2.1) may also contain a version backpointer 604 that points back to original volume structure 556(2).

Returning to FIG. 2, in step 130, computing device 32 operates a plurality of flushers 46 to persist the data (e.g., in PBs 49) indicated by respective PDs 51 to long-term persistent storage 38 based on organization of the PDs 51 in the SWSS 52, each flusher 46 accessing PDs 51 via the SWSS 52. In some embodiments, the various flushers 46 may each be a separate process, while in other embodiments, the flushers 46 may be lightweight threads that are scheduled to run on a separate container process on each core 35. There may be many flushers 46 running concurrently, possibly more than the number of cores 35.

In some embodiments, step 130 may include sub-steps 131-139, performed by each flusher 46.

Figure 9:
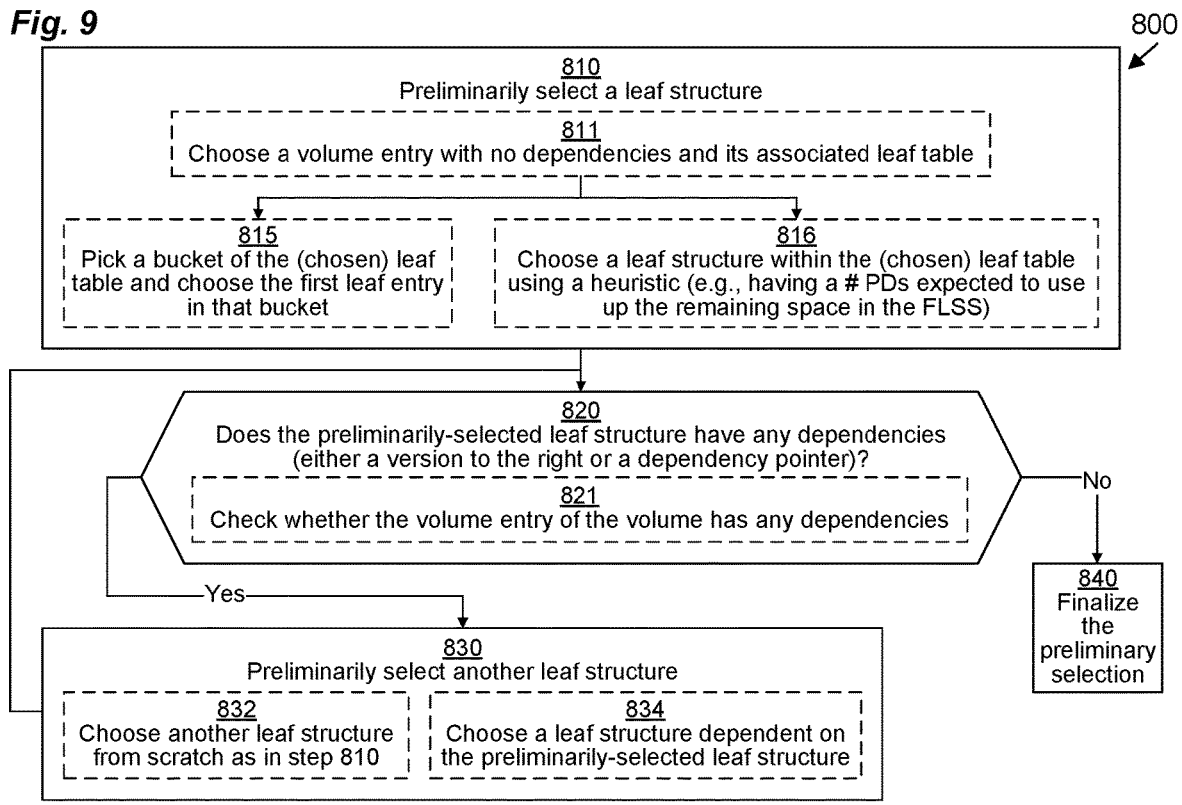
FIG. 9 is a flowchart depicting an example procedure according to various embodiments.

In sub-step 131, a flusher 46 selects a leaf structure 54 to detach from the SWSS 52. In some embodiments, sub-step 131 may be performed by selection method 800 of FIG. 9.

In step 810 of selection method 800, a flusher 46 preliminarily selects a leaf structure 254(Y). In some embodiments, step 810 first involves performing sub-step 811. Thus, initially, flusher 46 chooses a particular leaf hash table 202 by choosing a volume structure 556, 656 that does not have any dependencies. Thus, it should choose a volume structure 556 that is directly within a bucket chain (see FIGS. 6A-6C) rather than a volume structure 556 that is pointed to by a version pointer 606 from another volume structure 556. In addition, the chosen volume structure 556 should not have a set dependency pointer 610. The chosen leaf hash table 202 is indicated by the leaf table pointer 630 of the chosen volume structure 556.

In some embodiments, step 810 also includes sub-step 815. In sub-step 815, flusher 46 picks a bucket 204 of the leaf hash table 202 (selected in sub-step 811) and chooses a leaf structure 254(Y) within the chain of that bucket 204 (e.g., initially the topmost leaf structure 254 in the bucket 204). In some embodiments, flusher 46 may choose the bucket 204 randomly, while in other embodiments, flusher 46 may iterate through the buckets 204 in order. In yet other embodiments (sub-step 816), flusher 46 may use a heuristic to intelligently choose a bucket 204 or leaf structure 254(Y). One example of a heuristic chooses a leaf structure 254(Y) whose #PDs hint 324(Y) indicates a number of PDs 351 that are expected to fill out the remainder of the FLSS 44 assigned to that flusher 46, based on the size of a standard PB 49 and an expected data reduction ratio (i.e., the total factor by which data size is reduced taking into account both compression and deduplication). Thus, for example, if a PB 49 is 4 kilobytes (KB), the expected data reduction ratio is 4.4, and the FLSS 44 assigned to that flusher 46 has 50 KB of remaining space, then that flusher 46 attempts to choose a leaf structure 254(Y) whose #PDs hint 324 is about 55.

After step 810, in step 820, flusher 46 determines whether the preliminarily-selected leaf structure 254(Y) has any dependencies. For example, this may include verifying that both the version pointer 306(Y) and the dependency pointer 310(Y) of the preliminarily-selected leaf structure 254(Y) are NULL. In some embodiments, flusher 46 also verifies (sub-step 821) that the volume structure 556 of the volume to which the preliminarily-selected leaf structure 254(Y) belongs also has no dependencies (i.e., both the version pointer 606 and the dependency pointer 610 are NULL). If step 820 has a negative result, then flusher 46 finalizes the preliminarily-selected leaf structure 254(Y) as the final selection. Otherwise, in step 830, flusher 46 preliminarily selects another leaf structure 254(Y') and loops back to step 820, repeating as long as necessary. In some embodiments, step 830 is performed by performing sub-step 832, in which another leaf structure 254 is chosen from scratch as in step 810. In other embodiments, step 830 is performed by performing sub-step 832, in which flusher 46 preliminarily selects as the next leaf structure 254(Y') a leaf structure 254 that is dependent on the previous preliminarily-selected leaf structure 254(Y) (e.g., by following the version pointer 306(Y) or the dependency pointer 310(Y) of the preliminarily-selected leaf structure 254(Y)).

Returning to FIG. 2, after sub-step 131, flusher 46 performs sub-step 132. In sub-step 132, flusher 46 detaches the selected leaf structure 254(Y) from the SWSS 52. For example, if leaf structure 254(2) from FIG. 3C is the selected leaf structure 254(Y), then chaining pointer 302(1) for leaf structure 254(1) is changed to point to leaf structure 254(2.1), and chaining pointer 302(2.1) for leaf structure 254(2.1) is changed to point to leaf structure 254(3). As another example, if leaf structure 254(2) from FIG. 3A is the selected leaf structure 254(Y), then chaining pointer 302(1) for leaf structure 254(1) is changed to point to leaf structure 254(3).

Figure 10:
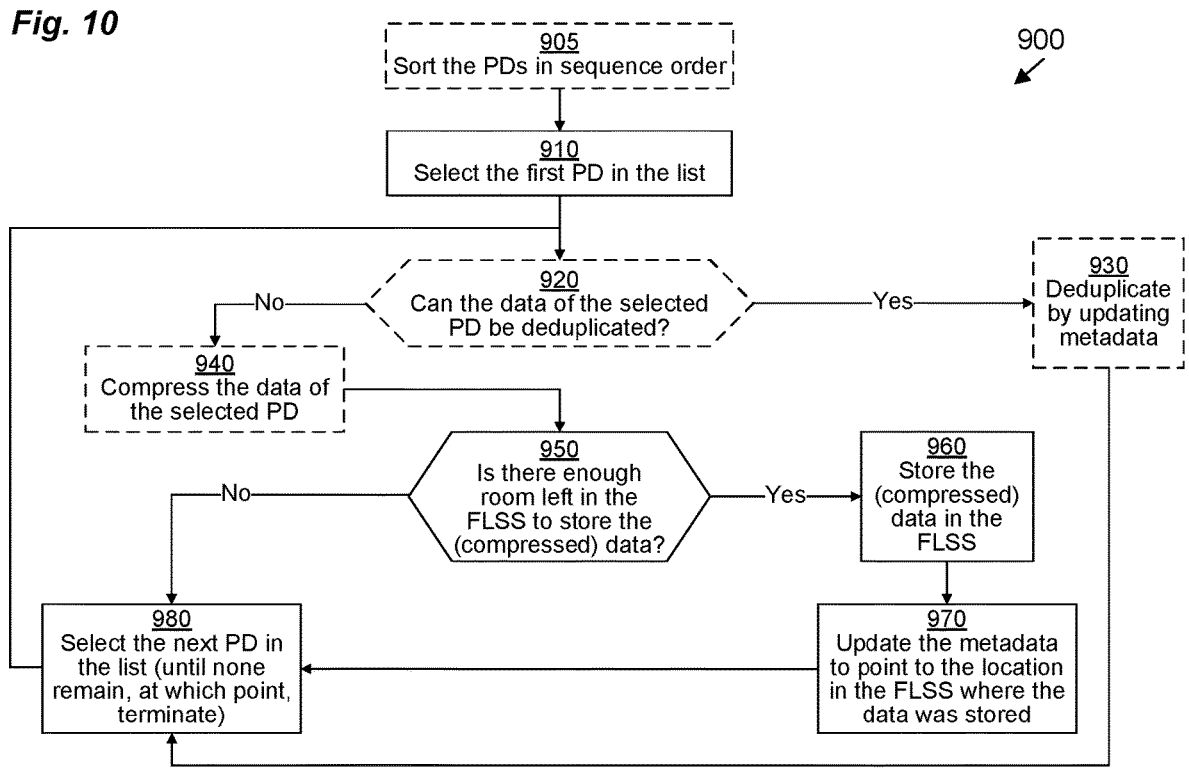
FIG. 10 is a flowchart depicting an example procedure according to various embodiments.

Then, in sub-step 133, flusher 46 persists data from the PDs 351 in the linked list 321(Y) of the (now detached) selected leaf structure 254(Y) to the FLSS 44 respectively associated with the flusher 46, as long as room remains within that FLSS 44. In some embodiments, sub-step 133 may be accomplished by performing method 900 of FIG. 10.

In some embodiments, method 900 begins by sorting the PDs 351 in the linked list 321(Y) in sequence order. Then, in step 910, flusher 46 selects the first PD 351(1) in the linked list 321(Y). Then, in some embodiments, in step 920, flusher 46 determines whether or not the data of the PB 49 of the selected PD 351 can be deduplicated. If so, then, in step 930, flusher 46 deduplicates the PB 49 by updating metadata 53 to reference a previously-stored version of that PB 49 and frees the PD 351 and its PB 49, after which operation proceeds to step 980.

If 920 yields a negative result (or in embodiments in which step 920 is omitted), operation proceeds with step 940, if compression is being used. In step 940, flusher 46 compresses the data of PB 49 and proceeds to step 950.

In step 950, flusher 46 determines whether or not the (compressed) data can fit into the FLSS 44. If so, then, in step 960, flusher 46 stores the (compressed) data in the FLSS 44, and in step 970, flusher 46 updates the metadata 53 to point to the location in the FLSS 44 where the (compressed) data was stored and frees the PD 351 and its PB 49.

Step 980 is performed after steps 930 and 970, as well as after a negative result from step 950 (although in some embodiments, a negative result in step 950 may result in method 900 terminating). In step 980, flusher 46 selects the next PD 351 in the linked list 321(Y). If no PDs 351 remain at the end of the linked list 321(Y), then method 900 terminates. Otherwise, operation returns back to step 920 (or step 940 or 950, if deduplication or both deduplication and compression are not being used).

Returning to FIG. 2, after sub-step 133, operation proceeds with sub-step 134. In sub-step 134, flusher 46 determines whether the FLSS 44 is full. If not (and the selected leaf structure 254(Y) was flushed fully), then operation proceeds with sub-step 135, in which flusher 46 follows the dependency backpointer 312(Y) for the selected leaf structure 254(Y) (unless it is NULL), and removes the dependency from whatever leaf structure 254 depended on the selected leaf structure 254(Y) (i.e., by setting the dependency pointer 310 of that leaf structure 254 to NULL). Then, in sub-step 136, operation returns back to sub-step 131 to select another leaf structure 254 to be detached and flushed.

If sub-step 134 yields an affirmative result, then flusher 46 determines whether there are any PDs 351 remaining in the linked list 321(Y) of the selected leaf structure 254(Y). If so, then, in sub-step 138, flusher 46 reattaches that selected leaf structure 254(Y) back into the location in the SWSS 52 from which it was removed (in step 132) and proceeds to step 139. Otherwise, in sub-step 137, flusher 46 follows the dependency backpointer 312(Y) for the selected leaf structure 254(Y) (unless it is NULL), and removes the dependency from whatever leaf structure 254 depended on the selected leaf structure 254(Y) (i.e., by setting the dependency pointer 310 of that leaf structure 254 to NULL).

Sub-step 139 follows steps 137 and 138. In sub-step 139, flusher 46 closes out the current FLSS 44 on the long-term persistent storage 38 and then starts over again with a new empty FLSS 44.

Adaptive Address Range for Leaf Structures

The Log/Flush architecture described may exhibit certain deficiencies at least in certain use cases. In particular these fall into two classes: (1) Excessive memory usage (memory footprint), and (2) performance penalty due to certain contention among the flushers 46 (MID lock contention). Below is a brief description of the nature of these problems, followed by description of additional structure and functionality for addressing them, i.e., improving memory efficiency and reducing performance penalty due to MID lock contention.

Regarding the memory footprint of the SWSS 52, this structure may be used in two edge case scenarios that together can drive up memory usage:

1. Maximal number of leaf structures 54 (Completely random IO workload with huge working set, so each leaf structure 54 contains just 1 entry)

To support this scenario, it should be possible to allocate on the order of 4 million leaf structures 54 for example. Since all this workload could be issued to the same volume (i.e. all those 4 million leaf structures are located in the LHT 202 of a single volume), the LHT 202 of volume should contain at least 1 million buckets to provide efficient lookup. For efficiency in this scenario, the volume structures should be created with maximal LHT size (1 million buckets) i.e. 8 MB for each volume.

2. Maximal number of volume structures in FWS (e.g. 50000 small volumes that are concurrently written).

To support this scenario, it should be possible to allocate a very large number (e.g., 50000) volume structures.

Thus, to be prepared for both edge cases may require more than 400 GB of memory (50000×8 MB) for the SWSS 52, which in general may be an unacceptably large memory footprint.

Figure 11:
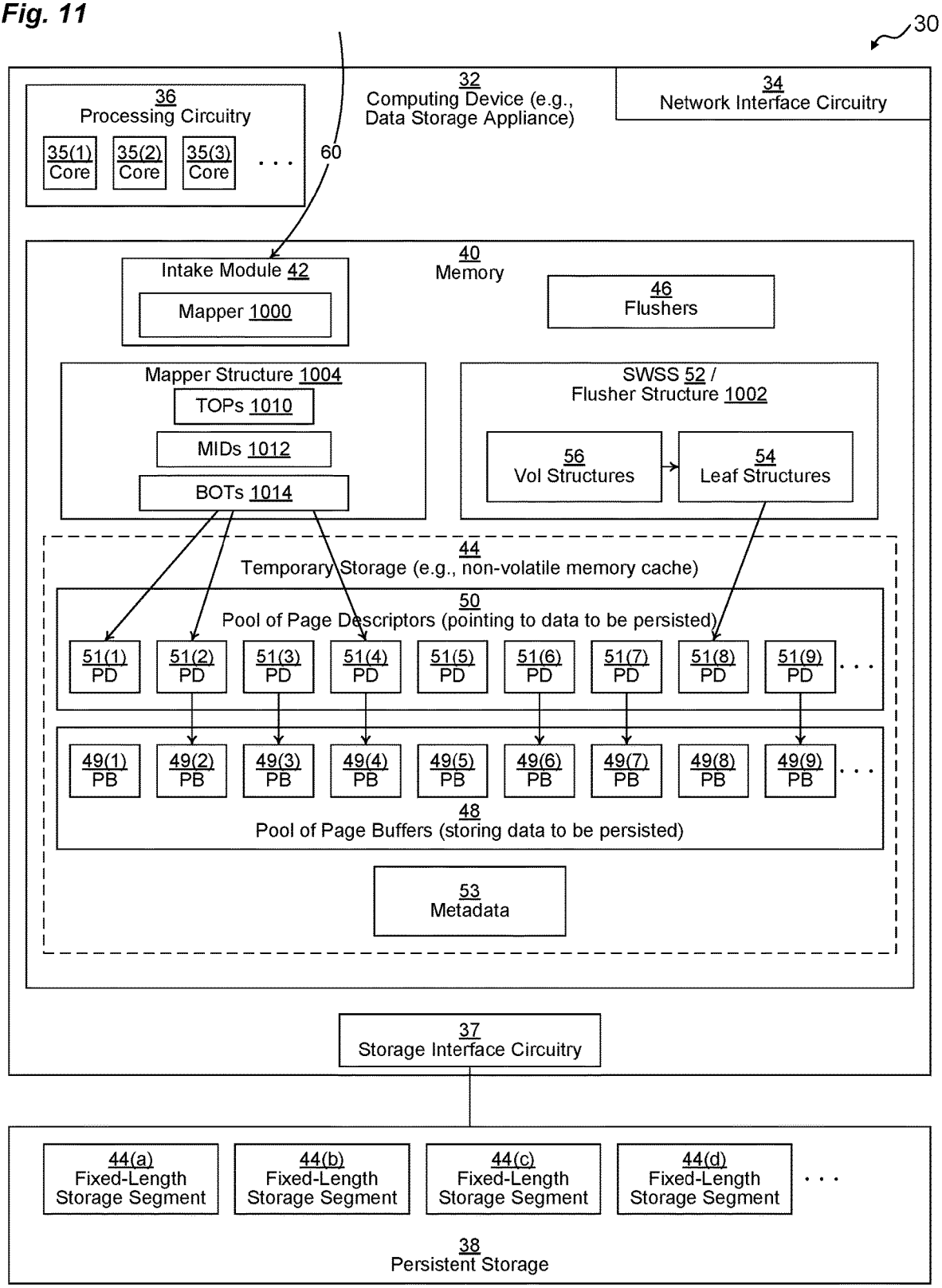
FIG. 11 is a block diagram depicting an example system, apparatus, and data structure arrangement for use in connection with various embodiments.

The MID contention problem is explained with reference to FIG. 11, which is another depiction of the environment 30 (FIG. 1) showing additional detail. The intake module 42 includes a mapper 1000, and the memory 40 further stores a mapper structure 1004 in addition to the SWSS 52. The SWSS 52 is also identified as a flusher structure 1002, to clarify its use in connection with flushing in particular (as described above) as distinct from intake operations of the intake module 42 that use the mapper structure 1004. Also in this depiction the SWSS 52 is shown as including volume structures 56 in addition to the leaf structures 54, where the volume structures 56 are generalizations of the volume structures 556, 656 shown in FIGS. 6A-6C and 7 and described above.

The mapper structure 1004 has a hierarchical organization of blocks of indirect pointers, used to translate or map the LBAs of a very large namespace (e.g., on the order of 1 exabyte ($10^{18}$ bytes)) to respective PDs 51 for the associated data. In particular, in this arrangement the mapper has a 3-level structure including top-level pointer blocks (TOPs) 1010, mid-level pointer blocks (MIDs) 1012, and bottom-level pointer blocks (BOTs) 1014. In one embodiment each pointer block may contain 512 pointers for example. Each TOP pointer points to a respective MID 1012, and each MID pointer points to a respective BOT 1014, and each pointer of a BOT 1014 points to a respective PD 49. In one embodiment, a given MID 1012 covers a corresponding 1 GB range of the address space (512×2 MB, where 2 MB is range of each BOT 1014).

During operation, both the intake module 42 and the flushers 46 access the mapper structure 1004 to track the logical presence, location, status and other information about the underlying data as stored in the PBs 49 and referenced by the PDs 51. When a BOT 1014 is added, removed, or modified in certain ways, there are associated updates to a corresponding MID 1012. In some embodiments, some updates of this type are performed by the flushers 46 in a "late bind" part of their flushing operations. With late bind, when a flusher 46 writes new data to a FLSS 44 of persistent storage 38, it updates a corresponding pointer in an associated BOT 1014. If that BOT 1014 does not yet exist, it is first created, and the flusher 46 adds a pointer for this new BOT in the appropriate MID 1012 (based on the LBA).

In some situations (e.g., new data being written across a large area) there may be many new BOTs 1014 created for the same MID 1012 in a given flush cycle, so that several flushers 46 need to update the same MID 1012 concurrently. This can create undesirable contention for access to this MID 1012, adversely impacting performance. In particular, consider a common scenario of a snapshot being created and there being a large number of small non-contiguous writes to the address range for a given MID 1012. In this case the SWSS 52 can contain up to 512 leaf structures 54 related to the same MID 1012, while each leaf structure 54 may contain very few (e.g., as few as 1 on average) entries. This means that generally there will be concurrent flushing for leaf structures 54 related to the same MID 1012. This can cause excessive lock contention on that MID 1012 and lead to performance degradation accordingly.

To address the above-described problems of memory footprint and contention-related performance degradation, the SWSS 52 may be realized in a certain way. As described above with reference to FIGS. 3A and 4, the leaf structures 254 are associated with corresponding address ranges, and buckets 204 are identified by hashing an identifier of an address range (e.g., address of first block of the range). Also, each leaf structure 354 may store an address range identifier 322 identifying its associated address range. In one embodiment, the size of these address ranges is fixed, e.g., at 2 MB (which corresponds to a 13-bit logical block address, for 256-byte logical blocks). This arrangement has the advantage of simplicity, and may provide acceptable performance in many use cases.

However, there is no requirement that the address range be any particular size, nor that the size be fixed for all time. When the address range size is fixed, it can contribute to the above-described problems of memory footprint and MID contention, as explained more fully below. Thus, in other embodiments as described below, the address range size is dynamically adjustable, enabling the computing device 32 to adapt its operation to workload and thereby improve both memory efficiency of the SWSS 52 and flushing performance accordingly. Memory efficiency can be improved by reducing the number of leaf structures 54 and LHT size accordingly, while still providing for efficient leaf lookup, and performance can be improved by making fuller use of individual flushers 46, with reduced contention on the MIDs 1012.

Figure 12A:
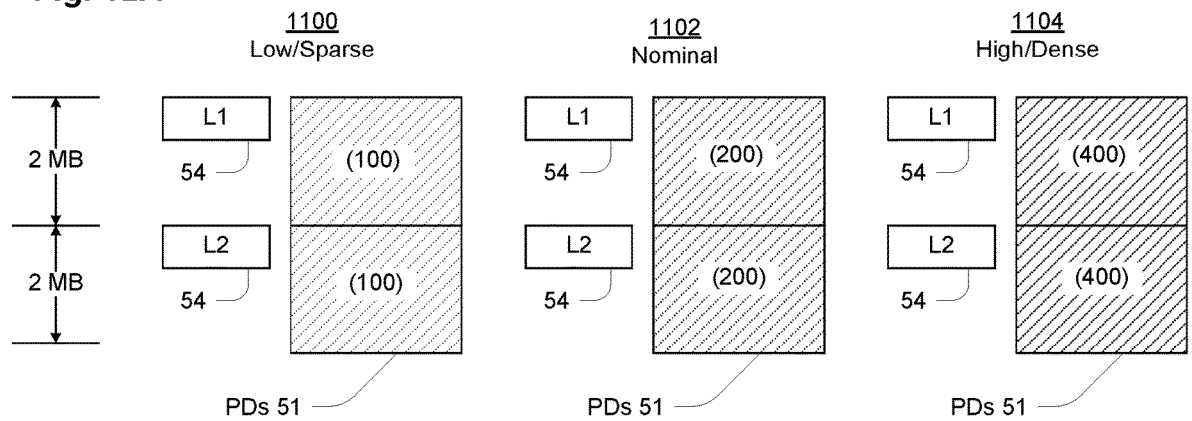
FIGS. 12A-12B are schematic illustrations of example data arrangements according to various embodiments.
Figure 12B:
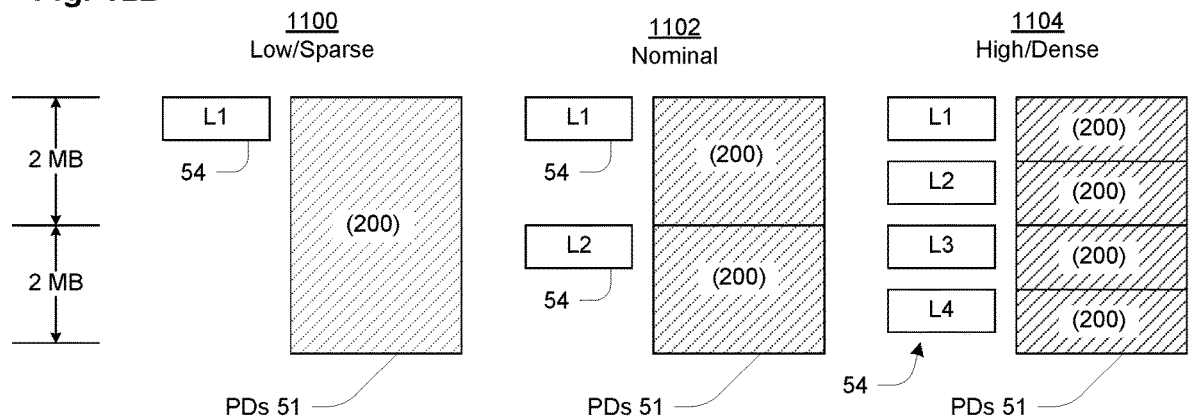

FIGS. 12A and 12B are schematic depictions of relationships between PDs 51 and leaf structures 54 in an example address range, for three separate workload scenarios shown as Low/Sparse 1100, Nominal 1102, and High/Dense 1104. FIG. 12A illustrates these relationships for these workload scenarios when a fixed-size address range is used for the leaf structures 54, while FIG. 12B illustrates these relationships for the same workloads in the case of using a dynamically varying (adaptive) address range size. Both diagrams show an example address range of 4 MB, being two adjacent areas of 2 MB each (corresponding to the example fixed address range size of 2 MB).

For illustration purposes it is assumed that the average population of PDs 51 in each 2 MB area is as follows for the three workload scenarios:

Low/Sparse—100/2 MB
Nominal—200/2 MB
High/Dense—400/2 MB

In FIG. 12A, there is one leaf structure 54 for each 2 MB range, which is fixed and thus the same regardless of workload. It will be appreciated that in the three workload scenarios the leaf structures 54 use different proportions of memory relative to the PDs 51. If it is assumed, just for illustration, that a leaf structure 54 and PD 51 are the same size, then the relative size proportion of the leaf structures 54 is 1% (1/100), 0.5% (1/200), and 0.25% (1/400) for Low/Sparse 1100, Nominal 1102 and High/Dense 1104 respectively. In a more realistic real-world, worst-case scenario, the proportion for a low/sparse workload could be much greater than 1%, e.g., as high as 100% if there were only about one PD 51 per 2 MB address range on average. This illustrates the potential memory inefficiency of the fixed-size address range approach. Conversely, for the dense workload scenario 1104, although it is inherently more memory efficient, it could suffer from reduced parallelism due to the large number of PDs 51 per leaf structure 54. Recall that a leaf structure 54 essentially represents the unit of work of the flushers 46, i.e., that each flusher 46 detaches a leaf structure 54 and processes all the associated PDs 51 and PBs 49. In the dense scenario 1104, individual flushers 46 will be busy for longer periods, such that some opportunities for parallelism may be missed and thus concurrency could be reduced accordingly.

FIG. 12A also illustrates the problem of MID lock contention. Consider a hypothetical case in which the first 400 PDs 51 of the address range are flushed in a given cycle. For the High/Dense workload 1104, this would require utilization of only one leaf 54 (L1), while in the Nominal and Low/Sparse scenarios it would require utilization of two and four leafs 54 respectively. Thus, in the Low/Sparse scenario 1100 there would be on the order of 4× accesses to the associated MID 1012 and corresponding contention, relative to the High/Dense workload 1104.

FIG. 12B shows an alternative in which the address range for each leaf structure 54 is variable. Assuming the same PD population as for the example of FIG. 12A, it will be appreciated that the ratio of leaf structures 54 to PDs 51 is now the same for all three workloads:

Low/Sparse—1 leaf, 200 PDs→0.5%
Nominal—2 leafs, 400 PDs→0.5%
High/Dense—4 leafs, 800 PDs→0.5%

This represents the ability to tailor memory usage to the workload, which is especially helpful in a Low/Sparse scenario 1100 for example. This aspect can also help reduce MID lock contention depending on the exact nature of the workload. It also represents the ability to tailor the per-cycle workload of the flushers 46, which can be helpful to improve concurrency (and thus flushing performance) in a High/Dense scenario 1104.

Figure 13:
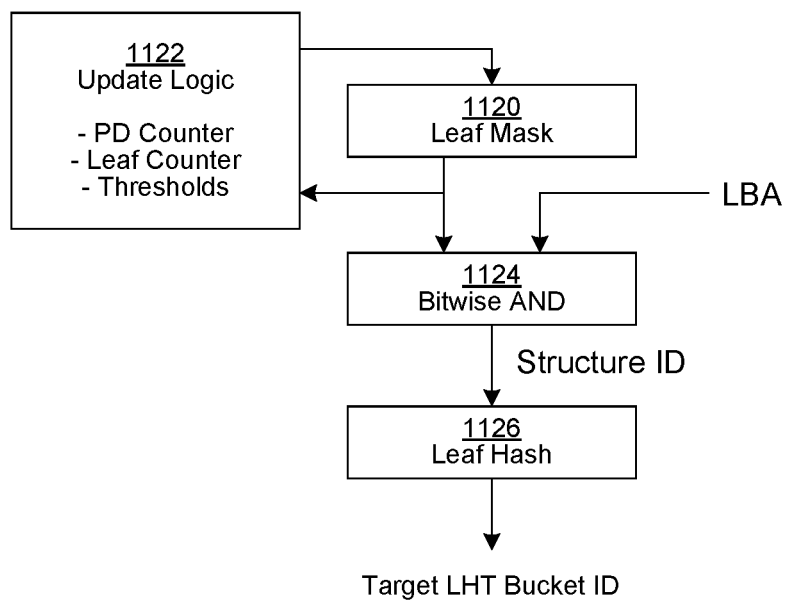
FIG. 13 is a schematic diagram depicting example circuitry according to various embodiments.

FIG. 13 illustrates logic implemented by the processing circuitry 36 in one embodiment to realize the adaptive address range size scheme that is depicted in simplified form in FIG. 12B. The logic is based on use of a leaf mask 1120 and update logic 1122 that monitors certain operating conditions and modifies the leaf mask 1120 accordingly. As shown, the logic includes a bitwise-AND function 1124 that performs a bitwise-AND between the leaf mask 1100 and the logical block address (LBA) to produce an address value that functions as a Structure ID. This value is applied to a leaf hash function 1126 that produces an identifier of the target LHT bucket 204, as described above. As described more below, the value of the leaf mask 1120 defines the size of the address range that is associated with a given leaf structure 54, and the update logic 1122 thus adapts this address range by varying the value of the leaf mask 1120 accordingly.

At a high level, the logic of FIG. 13 implements a technique which can be summarized as follows:

1. Monitor the number of PD entries relative to the number of Leaf structures, and
   Dynamically increase the scope (size of address range) of the Leaf structures when the average number of PDs per Leaf structure is below some defined threshold
   Dynamically decrease the scope of the Leaf structures when the average number of PDs per Leaf structure is above some defined upper threshold
2. Make the above change in scope on certain events, so that in operating periods between the events the scope is constant and operation is coherent. For example, scope can be changed as part of a periodic switch or re-creation of the SWSS 52. In another approach, it is done in response to a "horizontal split" of a volume, as described above.

The mechanism above can enable the usage of the leaf structures 54 to be more optimal, improving memory footprint and lookup flow, and reducing MID contention.

Now more specifically, the above scheme is realized in one embodiment using the variable leaf mask 1120, which is referred to below as the LBA_LEAF_MASK variable. LBA_LEAF_MASK defines entries grouping policy inside the low level (Leaf) structures. Specifically, LBA_LEAF_MASK has the same length (#of bits) as a regular LBA address and has a pattern of most-significant 1-bits and least-significant 0-bits that constitute the mask and define which portion of an LBA serve to identify a corresponding leaf structure 54. To illustrate, assume the following example LBA_LEAF_MASK:

0xFFFF FFFFF FFFF E000

Because the least significant 13 bits are zeroed, this mask defines a Leaf container scope (address range size) of 2 MB, assuming a logical block size of 256 bytes ($2^{13}$=8 K, multiplied by 256 yields 2 MB range size).

Thus in FIG. 1, the bitwise AND function 1124 generates the Structure ID as (LBA & LBA_LEAF_MASK), where & represents bitwise-AND. Thus, all LBA bits at the same positions where LBA_LEAF_MASK has 1-bits are used for Structure ID, and thus all LBAs that are equal in these bit positions will hash to the same LHT Bucket, by further operation of the leaf hash 1126.

As shown in FIG. 13, the update logic 1122 maintains three data items: a PD Counter tracking the number of PDs 49 stored in association with leafs 54 of the SWSS 52; a Leaf Counter tracking the number of Leaf structures 54 occupying the SWSS 52; and a pair of threshold values defining a "ratio range", i.e., a range for the ratio of PDs to Leafs (average number of PDs per leaf structure). In one example, these threshold may be as follows:

High_Threshold (e.g. 512)
Low_Threshold (e.g. 64)

Note that High_Threshold must always be higher than Low_Threshold. In some embodiments these threshold values may be fixed, while in others they may be adjustable by configuration. Generally, they can be selected based on their effect on performance, as may be measured in performance testing for example.

Figure 14:
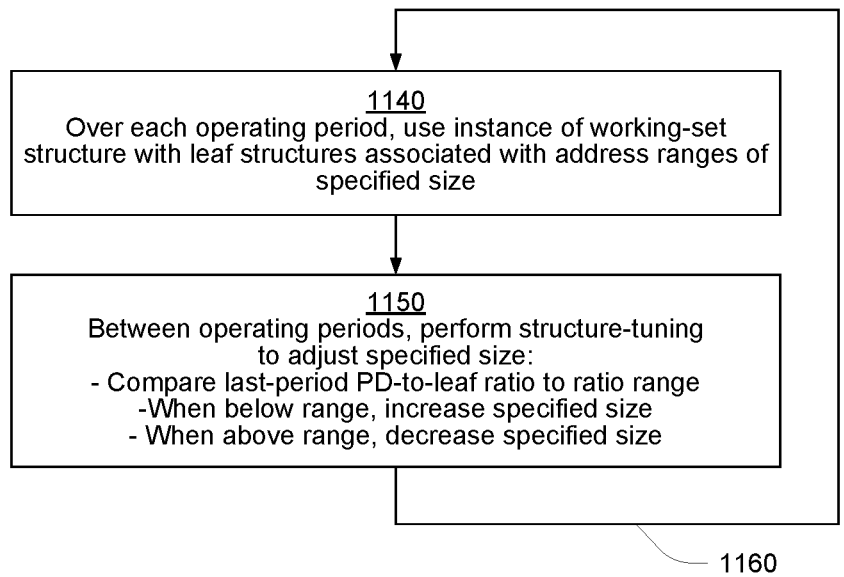
FIG. 14 is a flowchart depicting an example procedure according to various embodiments.

FIG. 14 illustrates operation at a high level. At 1140 is an extended operating period, which may be a period of use of a particular instance of the SWSS 52 before it is re-created for example (other mechanisms described below). In one example, this period may be on the order of 1 second. During this period, the computing device 32 uses a current instance of the SWSS 52 with leaf structures 54 associated with address ranges of a specified size, which is constant throughout the period. This size is implicitly specified by the LBA_LEAF_MASK as described above. For example, during a given period 1140 the LBA_LEAF_MASK may have its least-significant 13 bits zeroed, corresponding to an address range size of 2 MB as described above.

At the end of a period 1140, a structure-tuning operation is performed at 1150, after which a subsequent operating period 1140 is entered as indicated at 1160. "Structure-tuning" refers to the possible adjustment of the address range size for the leaf structures 54, which over time adapts (or tunes) the SWSS 52 to the workload. This operation includes:

1. Calculating the average number of PD entries per leaf structure, which is referred to as the "last-period PD-to-leaf ratio":

PD_counter/Leaf_counter

3. Comparing the last-period PD-to-leaf ratio to the ratio range defined by the thresholds as described above.

4. When the last-period PD-to-leaf ratio is lower than the Low Threshold, then the least significant one-bit in the LBA_LEAF_MASK is set to "0", therefore increasing the LBA range size for the leaf structures 54 by a factor of two.

5. When the last-period PD-to-leaf ratio is higher than the High_Threshold, then the most significant zero-bit in the LBA_LEAF_MASK is set to "1", therefore reducing the LBA range size for the leaf structures 54 by a factor of two.

Then during the next operating period 1140, the leaf structures 54 in the new SWSS 52 are created, filled and handled according to the new LBA_LEAF_MASK. Generally, this should tend to bring the PD-to-leaf ratio into the ratio range between the High and Low thresholds over time, thus dynamically adapting the structure to the load pattern.

Figure 15:
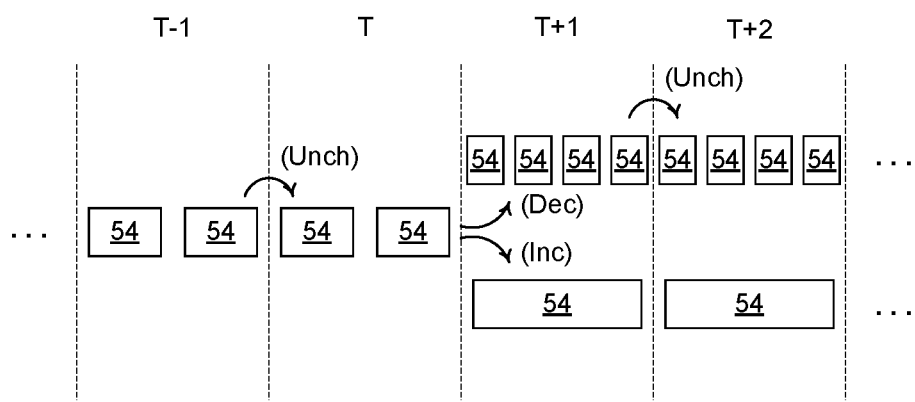
FIG. 15 is a schematic illustration of operation over a succession of operating periods according to various embodiments.
Figure 16:
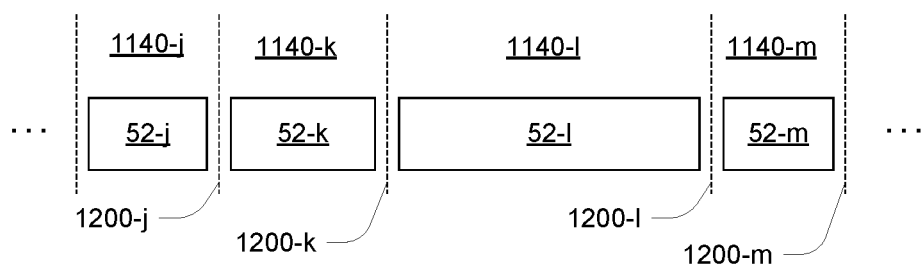
FIG. 16 is a schematic illustration of operation over successions of operating periods according to various embodiments.

FIGS. 15 and 16 illustrate (in simplified form) the results of the above operation. FIG. 15 shows a succession of operating periods for two scenarios, with the relative sizes of the leaf structures 54 indicating the size of their address range. Thus in period T−1 and T, for example, the size may be 2 MB, so that two leaf structures 54 cover a 4 MB extent (as for the Nominal workload 1102 described above). Note that between T−1 and T, the structure-tuning operation 1150 leaves the size unchanged (UNCH). At the transition from T to T+1, however, it results in either a decrease (DEC) of the scope or and increase (INC) of the scope, realized using the leaf mask 1120 as described above for example, and then in T+1 and T+2 the new scope is used. A Decrease corresponds to the High/Dense workload 1104 as described above, while the Increase corresponds to the Low/Sparse workload 1100 as also described above.

FIG. 16 illustrates example intervals of a succession of operating periods 1140. In particular, the structure-tuning 1150 is performed based on events 1200 shown as 1200-*j*, 1200-*k*, 1200-*l* and 1200-*m*. In one embodiment, the events 1200 correspond to the SWSS 52 reaching a predetermined threshold of occupancy, such as 33% of log capacity for example. This may be measured as a corresponding threshold number N of PDs 51 occupying the SWSS 52. The occurrence of this condition will be based on workload and perhaps other operating conditions, and thus the lengths of the operating periods 1140 are generally variable accordingly. In other embodiments, the events 1200 may be events of horizontal structure splitting, as described above.

In the above description, the specified size for the LBA_LEAF_MASK is global for the entire data cache for each operating period 1140, which is beneficial because the rest of the logic can essentially be blind to the actual size. However, this approach may be less than ideal in some operating scenarios, especially when different volumes are experiencing different workloads. In that case, it be may be beneficial to support the use of different specified sizes for the leaf-structure address ranges for different volumes. This can be done in part by simply maintaining multiple distinct LBA_LEAF_MASKs for the separate volumes, and using the appropriate mask for identifying target leaf structures based on the volume being accessed. However, additional complexity is involved because of the possibility of operations involving volumes having different LBA_LEAF_MASKs, for example an "Xcopy" command from one volume to another. One issue is the flush dependency tracking. In the above description, there is a 1:1 relationship between leaf structures 54 in terms of dependencies, i.e., a leaf structure 54 needs to maintain only one Flush_Before point and one Flush_After point, to point to another same-scope leaf structure (same address range). However, if two volumes have different specified sizes for the address ranges for their leaf structures, then the relationship in general becomes N:1 and 1:N. For example, a leaf structure covering a 4 MB range may need two pointers to point to two corresponding leaf structures that each cover a 2 MB range, in a different volume. Thus, to support the use of volume-specific leaf masks generally requires some modification of the structure of the SWSS 52, and its use, accordingly.

In brief summary, the above described method dynamically adapts the SWSS 52 and flushing operation to the load pattern and uses a more optimal average number entries per leaf structure, which can provide for:

Reduced number of leaf structures in SWSS, and thus reduced SWSS memory footprint and traverse/maintaining cost Reduced flush "detaching container" impact/overhead Reduced MID contention during flush Thus, techniques have been presented techniques for organizing a cache (e.g., temporary storage 44) without using ring buffers in a manner that also improves dependency analysis and increases the utilization of fixed-length storage segments 44. This may be accomplished by organizing page descriptors 51 of a pool 50 of page descriptors 51 into a shared working-set structure 52 whose organization accounts for dependencies. This allows for many flushers 46 to independently operate in parallel to flush from the working-set structure 52 until each respective flusher's fixed-length storage segment 44 is full. By arranging the shared working-set structure 52 into easily-detachable containers (e.g., leaf structures 54), operation can be further optimized.

As used throughout this document, the words "comprising," "including," "containing," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. In addition, an identification herein of a particular element, feature, or act as being a "first" such element, feature, or act and another particular element, feature, or act as being a "second" such element, feature, or act should be construed as requiring that the "first" and "second" elements, features, or acts are different from each other, unless specified otherwise. Although certain embodiments are disclosed herein, it is understood that these are provided by way of example only and that the invention is not limited to these particular embodiments.

While various embodiments have been particularly shown and described, it will be understood by those skilled in the art that various changes in form and details may be made therein without departing from the spirit and scope of the appended claims.

For example, although various embodiments have been described as being methods, software embodying these methods is also included. Thus, one embodiment includes a tangible non-transitory computer-readable storage medium (such as, for example, a hard disk, a floppy disk, an optical disk, flash memory, etc.) programmed with instructions, which, when performed by a computer or a set of computers, cause one or more of the methods described in various embodiments to be performed. Another embodiment includes a computer that is programmed to perform one or more of the methods described in various embodiments.

Furthermore, it should be understood that all embodiments which have been described may be combined in all possible combinations with each other, except to the extent that such combinations have been explicitly excluded.

Finally, Applicant makes no admission that any technique, method, apparatus, or other concept presented in this document is prior art under 35 U.S.C. § 102 or 35 U.S.C. § 103, such determination being a legal determination that depends upon many factors, not all of which are known to Applicant at this time.

What is claimed is:

1. A method of flushing cached data to persistent storage in a data storage system, comprising:
over a succession of operating periods, using respective instances of a working-set structure to organize cached data for storing to persistent storage, the instances of the working-set structure including respective leaf structures referring to corresponding page descriptors (PDs) for respective data pages to be persisted, the leaf structures in each operating period being associated with respective distinct address ranges of a specified size, the specified size remaining constant over each operating period but generally varying between operating periods; and
between the operating periods, performing a structure-tuning operation to adjust the specified size of the address ranges and thereby dynamically adjust a PD-to-leaf ratio of the working-set structure, the structure-tuning operation including (1) comparing a last-period PD-to-leaf ratio of a last preceding operating period to a predetermined ratio range, (2) when the last-period PD-to-leaf ratio is below the predetermined ratio range, then increasing the specified size for use in a next-succeeding operating period, and (3) when the last-period PD-to-leaf ratio is above the predetermined ratio range, then decreasing the specified size for use in the next-succeeding operating period.

2. The method of claim 1, wherein the operating periods are defined according to a periodic re-creating of the working-set structure.

3. The method of claim 1, wherein in each operating period the specified size is a global value used for creating and other processing of all leaf structures of the working-set structure.

4. The method of claim 1, wherein in each operating period the specified size is one of a plurality of distinct specified sizes used for in connection with corresponding different volumes represented in the working-set structure.

5. The method of claim 1, wherein the specified size is indicated by a pattern of bits of a leaf mask, wherein more significant bits are set to 1 and correspond to an address portion specifying an address range, and less significant bits are set to zero and correspond to an address portion specifying a logical block within an address range.

6. The method of claim 5, wherein the specified size is increased by setting to zero a least-significant one bit of the leaf mask, and the specified size is decreased by setting to one a most-significant zero bit of the leaf mask.

7. The method of claim 1, further including, in each operating period, tracking a number of PDs and a number of leaf structures contained in the working set structure, and wherein the structure-tuning operation includes calculating the last-period PD-to-leaf ratio as a quotient of the tracked number of PDs to the tracked number of leaf structures.

8. The method of claim 1, wherein using the instances of the working-set structure includes:
storing page descriptors for received write operations within temporary storage, each page descriptor indicating respective data to be written;
upon storing each page descriptor, organizing that page descriptor into the working-set structure; and
operating a plurality of flushers to persist the data indicated by respective page descriptors to the persistent storage based on organization of the page descriptors in the working-set structure, each flusher accessing page descriptors via the working-set structure.

9. The method of claim 8, wherein:
the organizing includes causing a leaf structure to reference a set of related page descriptors; and
operating the plurality of flushers includes, by each flusher:
detaching a leaf structure from the working-set structure, and
persisting the data indicated by the page descriptors referenced by the detached leaf structure, to the persistent storage.

10. The method of claim 8, wherein:
organizing further includes setting a dependency field of a leaf structure to indicate that it must be processed after another leaf structure; and
operating the plurality of flushers to persist the data further includes operating each flusher to select, for detaching, a leaf structure with an empty dependency field indicating that it need not be processed after any other leaf structure.

11. The method of claim 8, wherein:
the shared working-set structure includes a hash table; and
organizing that page descriptor into the shared working-set structure further includes hashing a location of that page descriptor and causing a leaf structure in a bucket of the hash table identified by the hashed location to reference that page descriptor.

12. The method of claim 11, wherein:
hashing a location of that page descriptor includes hashing an identifier of a range of logical block addresses, that page descriptor indicating data to be written to a block within the range; and
the leaf structure identified by the hashed location references page descriptors indicating data to be written to blocks within the range of that location.

13. A data storage apparatus, comprising:
temporary storage;
long-term persistent storage; and
processing circuitry coupled to memory configured to flush cached data to persistent storage by:
over a succession of operating periods, using respective instances of a working-set structure to organize cached data for storing to persistent storage, the instances of the working-set structure including respective leaf structures referring to corresponding page descriptors (PDs) for respective data pages to be persisted, the leaf structures in each operating period being associated with respective distinct address ranges of a specified size, the specified size remaining constant over each operating period but generally varying between operating periods; and
between the operating periods, performing a structure-tuning operation to adjust the specified size of the address ranges and thereby dynamically adjust a PD-to-leaf ratio of the working-set structure, the structure-tuning operation including (1) comparing a last-period PD-to-leaf ratio of a last preceding operating period to a predetermined ratio range, (2) when the last-period PD-to-leaf ratio is below the predetermined ratio range, then increasing the specified size for use in a next-succeeding operating period, and (3) when the last-period PD-to-leaf ratio is above the predetermined ratio range, then decreasing the specified size for use in the next-succeeding operating period.

14. The data storage apparatus of claim 13, wherein the operating periods are defined according to a periodic re-creating of the working-set structure.

15. The data storage apparatus of claim 13, wherein in each operating period the specified size is a global value used for creating and other processing of all leaf structures of the working-set structure.

16. The data storage apparatus of claim 13, wherein in each operating period the specified size is one of a plurality of distinct specified sizes used for in connection with corresponding different volumes represented in the working-set structure.

17. The data storage apparatus of claim 13, wherein the specified size is indicated by a pattern of bits of a leaf mask, wherein more significant bits are set to 1 and correspond to an address portion specifying an address range, and less significant bits are set to zero and correspond to an address portion specifying a logical block within an address range.

18. The data storage apparatus of claim 17, wherein the specified size is increased by setting to zero a least-significant one bit of the leaf mask, and the specified size is decreased by setting to one a most-significant zero bit of the leaf mask.

19. The data storage apparatus of claim 13, wherein the flushing includes, in each operating period, tracking a number of PDs and a number of leaf structures contained in the working set structure, and wherein the structure-tuning operation includes calculating the last-period PD-to-leaf ratio as a quotient of the tracked number of PDs to the tracked number of leaf structures.

20. A computer program product comprising a non-transitory computer-readable storage medium storing instructions, which, when performed by a data storage apparatus, cause the data storage apparatus to flush cached data to persistent storage by:
over a succession of operating periods, using respective instances of a working-set structure to organize cached data for storing to persistent storage, the instances of the working-set structure including respective leaf structures referring to corresponding page descriptors (PDs) for respective data pages to be persisted, the leaf structures in each operating period being associated with respective distinct address ranges of a specified size, the specified size remaining constant over each operating period but generally varying between operating periods; and
between the operating periods, performing a structure-tuning operation to adjust the specified size of the address ranges and thereby dynamically adjust a PD-to-leaf ratio of the working-set structure, the structure-tuning operation including (1) comparing a last-period PD-to-leaf ratio of a last preceding operating period to a predetermined ratio range, (2) when the last-period PD-to-leaf ratio is below the predetermined ratio range, then increasing the specified size for use in a next-succeeding operating period, and (3) when the last-period PD-to-leaf ratio is above the predetermined ratio range, then decreasing the specified size for use in the next-succeeding operating period.

* * * * *